(12) United States Patent
Matsuda et al.

(10) Patent No.: US 8,745,922 B1
(45) Date of Patent: Jun. 10, 2014

(54) GATE APPARATUS

(71) Applicant: Richell Corporation, Toyama (JP)

(72) Inventors: Yoichi Matsuda, Toyama (JP); Satoshi Urabe, Toyama (JP)

(73) Assignee: Richell Corporation (JP)

( * ) Notice: Subject to any disclaimer, the term of this patent is extended or adjusted under 35 U.S.C. 154(b) by 0 days.

(21) Appl. No.: 13/804,432

(22) Filed: Mar. 14, 2013

(30) Foreign Application Priority Data

Dec. 19, 2012 (JP) ................................. 2012-277024

(51) Int. Cl.
 *E06B 3/36* (2006.01)
 *E05B 65/06* (2006.01)

(52) U.S. Cl.
 USPC ........ 49/55; 49/463; 49/236; 49/269; 49/271; 49/274

(58) Field of Classification Search
 USPC ......... 49/50, 55, 57, 236, 234, 235, 268, 269, 49/271, 272, 274, 394, 463, 465
 See application file for complete search history.

(56) References Cited

U.S. PATENT DOCUMENTS

| | | | | |
|---|---|---|---|---|
| 610,121 A * | 8/1898 | Chenoweth | ...................... | 49/229 |
| 854,262 A * | 5/1907 | Young | ............................... | 49/272 |
| 1,244,910 A * | 10/1917 | Smith | ...................... | 292/341.15 |
| 1,378,183 A * | 5/1921 | Merz | ............................... | 49/238 |
| 2,062,738 A * | 12/1936 | Bigler | ........................... | 49/241 |
| 2,463,392 A * | 3/1949 | Kennel | ............................. | 49/271 |
| 2,661,556 A * | 12/1953 | Enghauser | ...................... | 49/238 |
| 4,566,223 A * | 1/1986 | Romberg | ........................ | 49/264 |
| 5,217,265 A * | 6/1993 | Lerner et al. | .................. | 292/200 |
| 6,176,042 B1 * | 1/2001 | Rossman et al. | ................. | 49/463 |
| 6,360,488 B1 * | 3/2002 | Darling | ............................. | 49/274 |
| 6,499,254 B2 * | 12/2002 | Rossman et al. | .................. | 49/55 |
| 7,540,046 B1 * | 6/2009 | Lai | ..................................... | 5/100 |
| 2001/0000556 A1 | 5/2001 | Rossman et al. | | |
| 2002/0178652 A1 * | 12/2002 | Marks | .............................. | 49/141 |
| 2003/0009945 A1 * | 1/2003 | Cheng | ................................ | 49/57 |
| 2010/0293861 A1 * | 11/2010 | Ting et al. | ........................ | 49/394 |
| 2011/0225890 A1 * | 9/2011 | Greenwood et al. | ............. | 49/394 |
| 2013/0118085 A1 * | 5/2013 | Hedemark | ....................... | 49/356 |

FOREIGN PATENT DOCUMENTS

| | | |
|---|---|---|
| GB | 2 406 612 | 4/2005 |
| JP | 2004-057685 | 2/2004 |

* cited by examiner

*Primary Examiner* — Katherine Mitchell
*Assistant Examiner* — Justin Rephann
(74) *Attorney, Agent, or Firm* — Harness, Dickey & Pierce, P.L.C.

(57) ABSTRACT

A gate apparatus includes a frame that is approximately in a shape of a letter "U", a gate that opens forward or backward, a rotational support device that supports the gate so that the gate rotates and moves upward relative to the frame, a locking device that locks the gate at a closed position, and a pedal device that unlocks the locking device. The pedal device includes a pair of pedals on the both sides of the gate, and a push-up member that is linked to the pair of pedals. The push-up member includes a push-up surface that tilts when the pedal is operated. The push-up surface tilts so that the push-up surface moves upward and comes in contact with the gate on the side closer to the pedal that has been operated, and applies a push-up force and a rotation force to the gate.

7 Claims, 10 Drawing Sheets

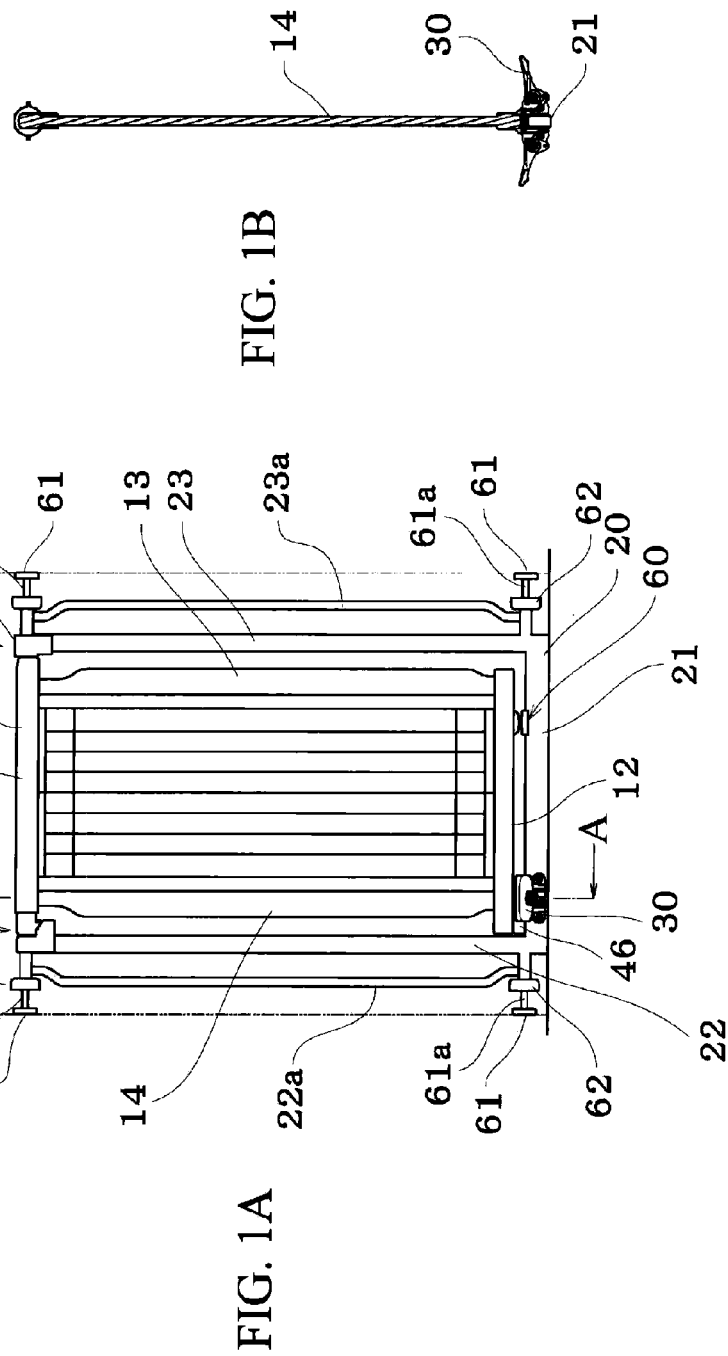

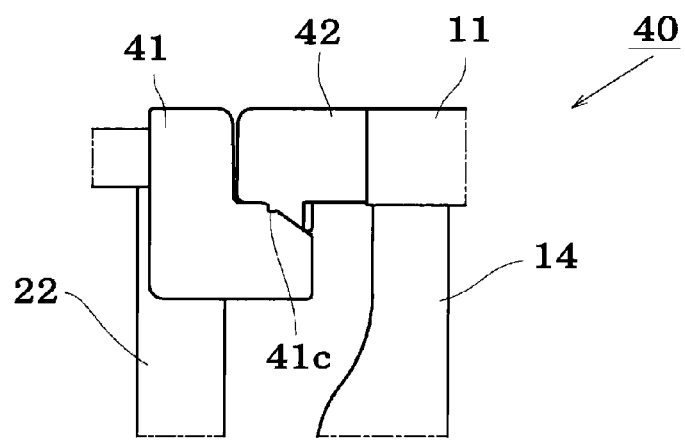
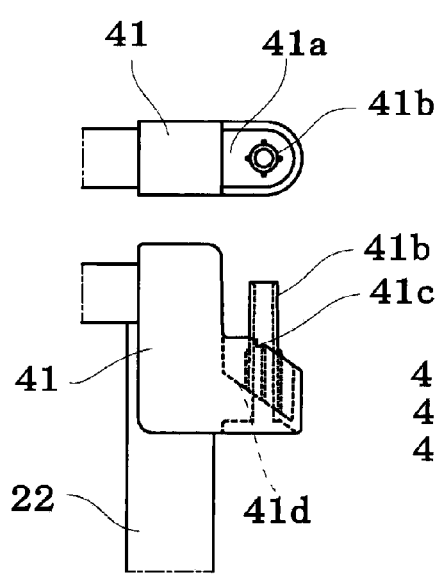
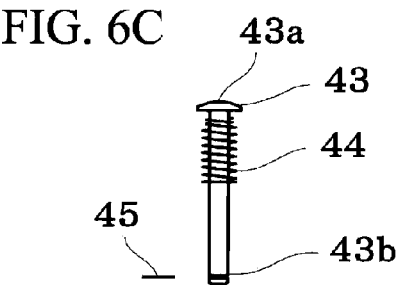
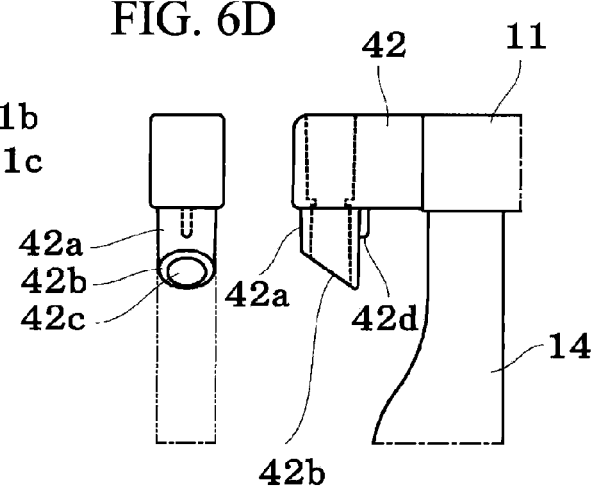

GATE APPARATUS

Japanese Patent Application No. 2012-277024 filed on Dec. 19, 2012 is hereby incorporated by reference in its entirety.

BACKGROUND

The present invention relates to a gate apparatus that can be opened and closed without using a hand.

A gate that restricts passage of a pet, and a gate that restricts access of a child to a dangerous area, have been known. US-A-2001/0000556 discloses a gate that is provided with a foot pedal that cannot be operated by a child.

However, the foot pedal disclosed in US-A-2001/0000556 is merely used to release the locked state of the gate, and does not open the gate forward.

JP-A-2004-57685 discloses a child safety fence that is configured so that a knee plate is provided above a pedal, and a gate can be opened forward with a knee while operating the pedal.

However, the pedal disclosed in JP-A-2004-57685 is also merely used to release the locked state of the gate.

SUMMARY

The invention may provide a gate apparatus that exhibits excellent operability, and is configured so that the locked state of a gate is released, and a force that opens the gate is applied by merely operating a pedal.

According to one aspect of the invention, there is provided a gate apparatus comprising:

a frame that is approximately in a shape of a letter "U";

a gate that opens forward or backward from a closed position at which the gate is disposed inside the frame;

a rotational support device that supports one side of the gate so that the gate rotates and moves upward relative to the frame;

a locking device that locks the gate at the closed position; and a pedal device that unlocks the locking device to open the gate, the pedal device including a pair of pedals that are disposed on a front side and a back side of the gate, and a push-up member that is linked to the pair of pedals, and the push-up member including a push-up surface that tilts when one of the pair of pedals is operated, the push-up surface tilting so that the push-up surface moves upward and comes in contact with the gate on a side closer to one of the pair of pedals that has been operated, and applying a push-up force and a rotation force to the gate.

The expression "opens forward or backward" used herein means that one side of the gate is rotatably supported, and the gate can be opened in the direction into which the user is making his way.

According to one aspect of the invention, when the front pedal is operated using a foot, the push-up surface of the push-up member tilts so that the front side of the push-up surface moves upward. The gate is moved upward by the tilted surface (push-up surface), and a rotation force that rotates the gate forward is applied to the gate due to the tilted surface (push-up surface). The locking device is released when the gate (that is supported by the rotational support device so that the gate can move upward and rotate) is moved upward due to the push-up force, and opened due to the rotation force.

Since the gate apparatus according to one aspect of the invention is configured so that the locked state is canceled when the gate is moved upward, the locked state can also be canceled, and the gate can be opened even when the gate is moved upward using a hand without operating the pedal.

Since the gate apparatus according to one aspect of the invention is configured so that the gate is opened by operating the pedal, the pair of pedals may respectively be biased to move downward when a force equal to or larger than 200 N has been applied, in order to prevent a situation in which the pedal is operated by a large dog or a child.

It is preferable to design the gate apparatus so that the pedal moves when an operation force (biasing force) equal to 200 to 300 N has been applied (i.e., a force that is normally applied by an adult).

An arbitrary structure may be employed for the device for which the locked state is canceled when the gate is moved upward.

For example, the locking device may include an upper locking device that is provided in an upper area on the other side of the gate, the upper locking device may include an upper locking pin that is biased to protrude from one of the gate and the frame, and an upper locking recess that is provided in the other of the gate and the frame, and an upper side of an inner surface of the upper locking recess may define a tilted surface.

In the gate apparatus, the locking device may include a lower locking device that is provided to a bottom of the gate, and the lower locking device may include a lower locking pin that is biased to protrude from one of the gate and the frame, and a lower locking recess that is provided in the other of the gate and the frame.

In the gate apparatus, the rotational support device may include a tilted receiving surface that is provided on a side of the frame, and a tilted sliding contact surface that is provided on a side of the gate, the tilted sliding contact surface may be placed on the tilted receiving surface from above, and the tilted receiving surface and the tilted sliding contact surface may come in surface contact with each other at a downward angle toward the gate when the gate is set to the closed position.

According to the above configuration, the gate does not move downward when the gate is open since the tilted receiving surface and the tilted sliding contact surface come in surface contact with each other. When a force that closes the gate from the open state is applied to the gate, the gate closes automatically to the closed position due to the weight of the gate and surface contact between the tilted receiving surface and the tilted sliding contact surface.

In the gate apparatus, the rotational support device may further include a spring that applies a force that causes the tilted sliding contact surface to come in contact with the tilted receiving surface, the spring may be compressed when the gate moves upward. According to the above configuration, the downward biasing force of the spring that has occurred when the gate has moved upward can be used to allow the gate to close automatically in addition to the weight of the gate.

In the gate apparatus, the push-up member may be disposed between the pair of pedals, and may be linked to the pair of pedals. Since the push-up member tilts so that the push-up surface moves upward on the side of the operated pedal, the push-up force that moves the gate upward, and the rotation force that opens the gate forward, can be applied to the gate by utilizing the tilted surface (push-up surface). This makes it possible to easily open the gate forward.

When the push-up member is linked to the pair of pedals at a position between the pair of pedals, the gate can be opened forward and backward using a common push-up member. It is also possible to implement a simple structure while ensuring excellent operability.

BRIEF DESCRIPTION OF THE DRAWINGS

FIG. 1A illustrates an example of the structure of a gate apparatus according to one embodiment of the invention, and FIG. 1B is a cross-sectional view taken along the line A-A illustrated in FIG. 1A.

FIG. 6A is an enlarged view illustrating the rotational support device, FIG. 6B illustrates an example of the structure of the rotational support device on the side of the support vertical frame, FIG. 6C illustrates the biasing pin, and FIG. 6D illustrates an example of the structure of the rotational support device on the side of the gate.

DESCRIPTION OF EXEMPLARY EMBODIMENTS

Figure 2A:
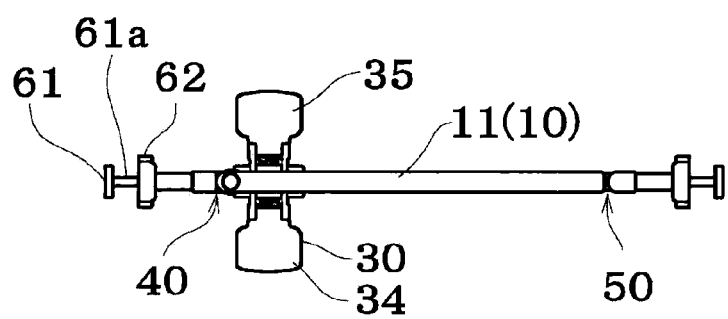
FIG. 2A is a plan view illustrating the gate apparatus in a state in which the gate is closed.

A gate apparatus according to one embodiment of the invention may be widely used in various fields as a hinged gate opening/closing apparatus.

For example, the gate apparatus according to one embodiment of the invention may be used as a gate that restricts passage of a pet, a gate that restricts access of a child, and the like.

The gate apparatus according to one embodiment of the invention is described below taking an example in which the gate apparatus is used to block a passageway.

Note that the gate apparatus according to one embodiment of the invention may also be used as an opening/closing gate of a pet circle or the like, or a gate apparatus of a fence that is placed in a passageway.

FIG. 1A illustrates an example of the structure of the gate apparatus according to one embodiment of the invention.

As illustrated in FIG. 1A, a frame 20 that is approximately in the shape of the letter "U" is secured between the walls of a passageway, and a gate 10 is disposed inside the frame 20.

The frame 20 includes a base section 21 that is disposed along the floor surface in the direction that crosses the passageway, and a support vertical frame 22 and a vertical frame 23 that extend upward from either side of the base section 21, and is provided upright to form an opening (passageway) that is generally in the shape of the letter "U".

The support vertical frame 22 is provided with an auxiliary frame 22a, and fixtures 61 are respectively screwed into the upper part and the lower part of the auxiliary frame 22a. The support vertical frame 22 is secured on the wall by adjusting the number of turns to press the fixture 61 against the wall.

An adjuster 62 that has an internal thread section into which an external thread section 61a of the fixture 61 is screwed, is provided to adjust the thrust amount of the fixture 61.

The vertical frame 23 is similarly provided with a fixture 61 and an adjuster 62 via an auxiliary frame 23a.

The support vertical frame 22 and the vertical frame 23 can be secured on the walls on either side of the passageway by turning the upper and lower adjusters 62 to adjust the thrust amount of the fixtures 61.

Note that the frame 20 may be secured and installed by an arbitrary method as long as the frame 20 can be disposed approximately in the shape of the letter "U".

The gate 10 has a configuration in which the ends of an upper crosspiece 11 and a lower crosspiece 12 are connected via a right vertical crosspiece 13 and a left vertical crosspiece in the shape of a frame, and a lattice is formed inside the frame using a wire rod. Note that the gate 10 may have a panel instead of a lattice.

Figure 3A:
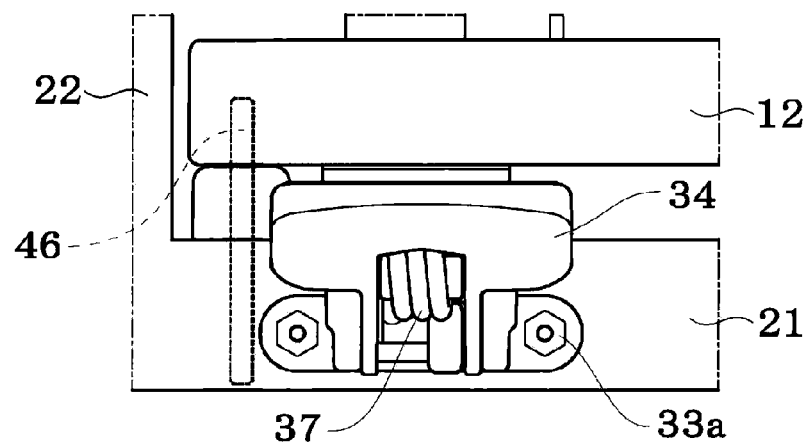
FIG. 3A is an enlarged view illustrating the pedal device.
Figure 3B:
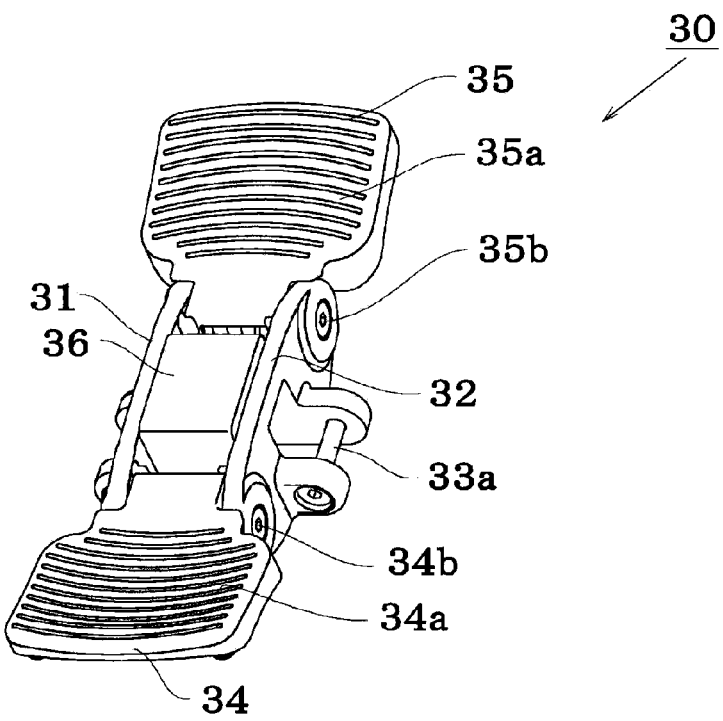
FIG. 3B is a perspective view illustrating the pedal device.
Figure 4:
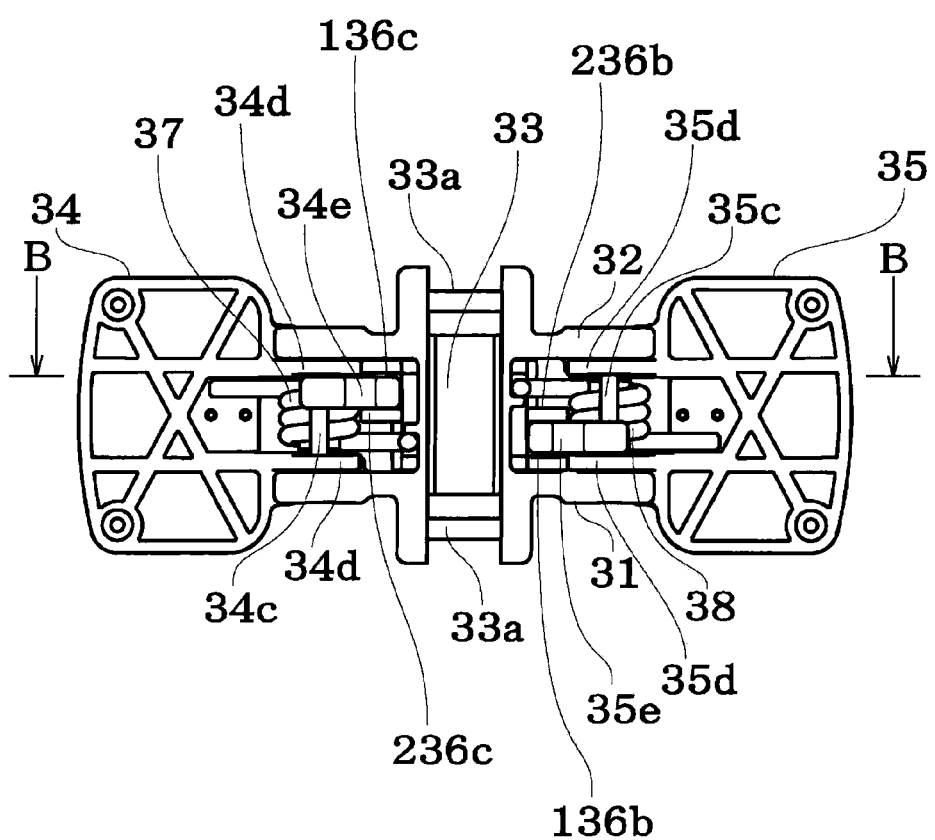
FIG. 4 is a bottom view illustrating the pedal device.

The end of the upper crosspiece 11 and the end of the lower crosspiece 12 positioned on one side of the gate 10 (left side in FIG. 1A) are rotatably supported by the frame 20. For example, the end of the upper crosspiece 11 is rotatably supported by the support vertical frame 22 via a rotational support device 40. The end of the lower crosspiece 12 is supported by the base section 21 via a rotation pin 46 (see FIGS. 1A and 3A).

The rotational support device 40 and the rotation pin 46 allow the gate 10 to move upward by a specific amount so that the gate 10 can be moved upward using a pedal device 30, or can be moved upward with a hand.

An upper locking device 50 is provided between the end of the upper crosspiece 11 and the upper end of the vertical frame 23 positioned on the other side of the gate 10 (right side in FIG. 1A (open side)). The gate 10 can have a lower locking device 60 that is positioned between the bottom surface of the lower crosspiece 12 and the base section 21.

As illustrated in FIG. 1B (cross-sectional view taken along the line A-A in FIG. 1A), the pedal device 30 is provided to extend across the base section 21. As illustrated in FIG. 2A (plan view), the pedal device 30 includes pedals 34 and 35 that are positioned on the front side and the back side of the gate 10 (upper crosspiece 11). When the pedal 34 or 35 is operated, the gate 10 is moved upward, and the upper locking device 50 and the lower locking device 60 are unlocked, so that the gate 10 opens.

Figure 2B:
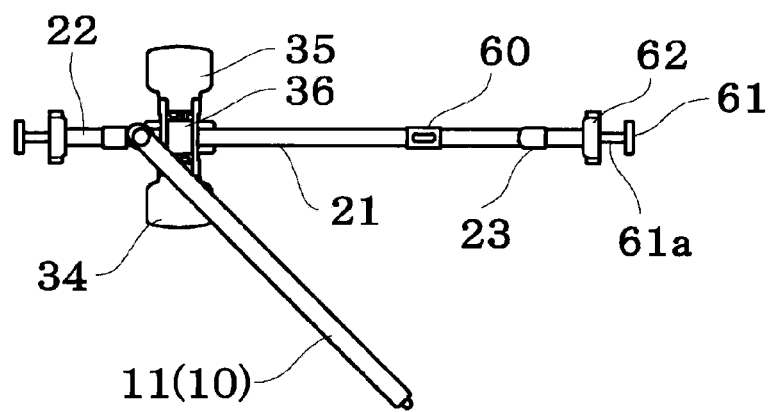
FIG. 2B is a plan view illustrating the gate apparatus in a state in which the gate is opened by operating the pedal.

When the pedal 35 is operated when the gate 10 is set to a closed state in which the gate 10 (upper crosspiece 11) is positioned inside the frame 20 (see FIG. 2A), the gate 10 (upper crosspiece 11) opens forward to move away from the operated pedal 35 (see FIG. 2B).

FIGS. 6A to 8E illustrate an example of the structure of the rotational support device 40.

As illustrated in FIG. 6A, the rotational support device 40 includes a receiving section 41 that is positioned on the side of the support vertical frame 22, and a rotation section 42 that is positioned on the side of the upper crosspiece 11 of the gate 10.

As illustrated in FIG. 6B, the receiving section 41 includes a pivot shaft 41b that is provided upright from the bottom of a pivot recess 41a. The bottom of the pivot recess 41a defines a tilted receiving surface 41d that is tilted toward the gate 10. The upper end of the pivot recess 41a is tilted in parallel to the tilted receiving surface 41d, and a locking recess 41c is formed in the vicinity of the uppermost part of the upper end of the pivot recess 41a.

As illustrated in FIG. 6D, the rotation section 42 includes a tubular section 42a that is inserted into the pivot recess 41a, and a locking rib 42d that is provided to the tubular section 42a. The locking rib 42d is provided on the side surface of the tubular section 42a that is positioned on the open side of the gate 10.

The lower end face of the tubular section 42a defines a tilted sliding contact surface 42b corresponding to the tilted receiving surface 41d that is formed at the bottom of the pivot recess 41a. The lowermost position of the tilted sliding contact surface 42b is situated on the open side of the gate 10 (i.e., on the side of the passageway).

Figure 7A:
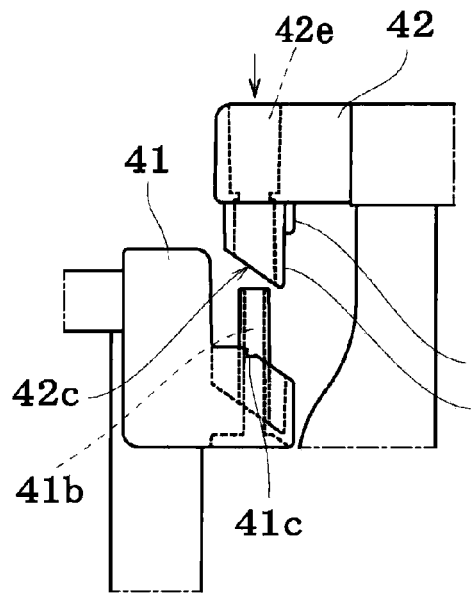
FIG. 7A illustrates a state in which the gate is rotatably supported by the support vertical frame.
Figure 7C:
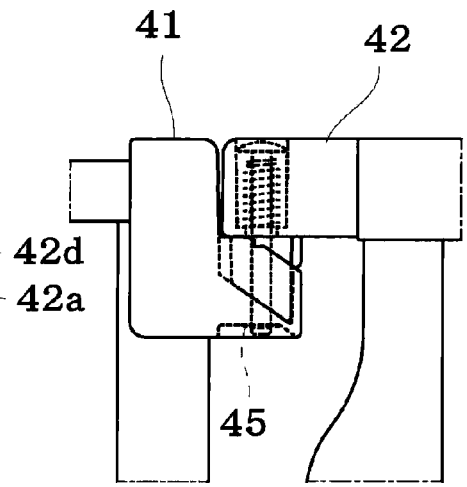
FIG. 7C illustrates a state in which the biasing pin is inserted.
Figure 7B:
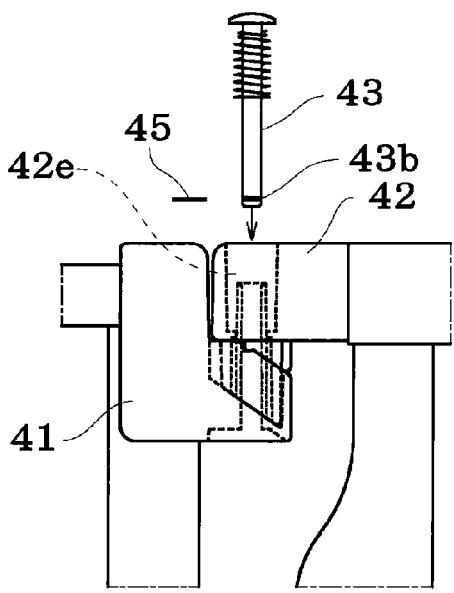
FIG. 7B illustrates a state when inserting the biasing pin.
Figure 7D:
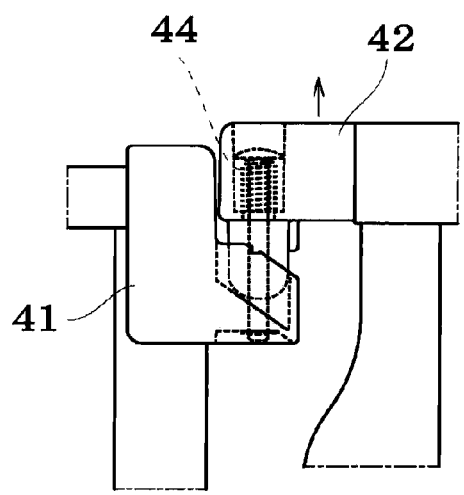
FIG. 7D is a view illustrating a state in which a downward biasing force is applied when the gate is moved upward.

As illustrated in FIG. 7A, the tubular section 42a of the rotation section 42 is pivotally fitted (inserted) into the pivot recess 41a. As illustrated in FIG. 7B, a biasing pin 43 is inserted into the pivot shaft 41b in a state in which the pivot shaft 41b is positioned inside a hollow section 42c of the tubular section.

As illustrated in FIG. 6C, the biasing pin 43 includes a head 43a having a diameter larger than that of the pin section, and an insertion groove 43b for a C-ring 45 that is formed at the end of the pin section, and a spring 44 is fitted to the pin section.

As illustrated in FIG. 7B, the biasing pin 43 is inserted into the pivot shaft 41b from above so that the lower end of the spring 44 comes in contact with the step portion of a step recess 42e. As illustrated in FIG. 7C, the C-ring 45 is inserted into the insertion groove 43b formed at the end of the pin section.

The C-ring 45 prevents the biasing pin 43 from falling out. The gate 10 is biased downward by the spring 44.

Figure 8A:
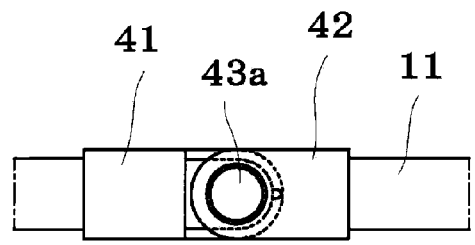
FIG. 8A illustrates a state in which the gate is closed.
Figure 8B:
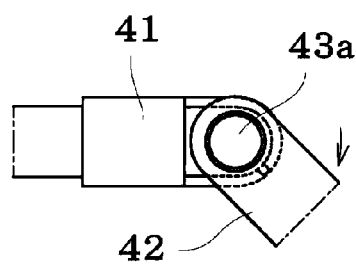
FIGS. 8B and 8C illustrate a state in which the gate is opened to some extent.

The tilted receiving surface 41d of the receiving section 41 comes in sliding contact with the tilted sliding contact surface 42b of the rotation section 42. As illustrated in FIGS. 8B and 8C, when the gate 10 is opened to some extent, the tilted sliding contact surface 42b of the rotation section 42 rotates while coming in sliding contact with the tilted receiving surface 41d of the pivot recess 41a, and the gate 10 moves upward against the weight of the gate 10 and the downward biasing force applied by the spring 44.

Figure 8D:
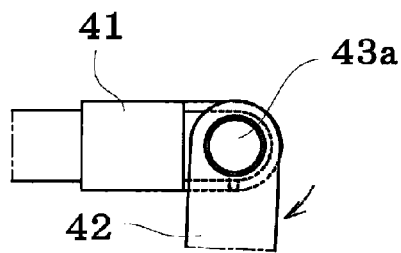
FIGS. 8D and 8E illustrate a state in which the gate is opened by 90°.
Figures 8C, 8E:
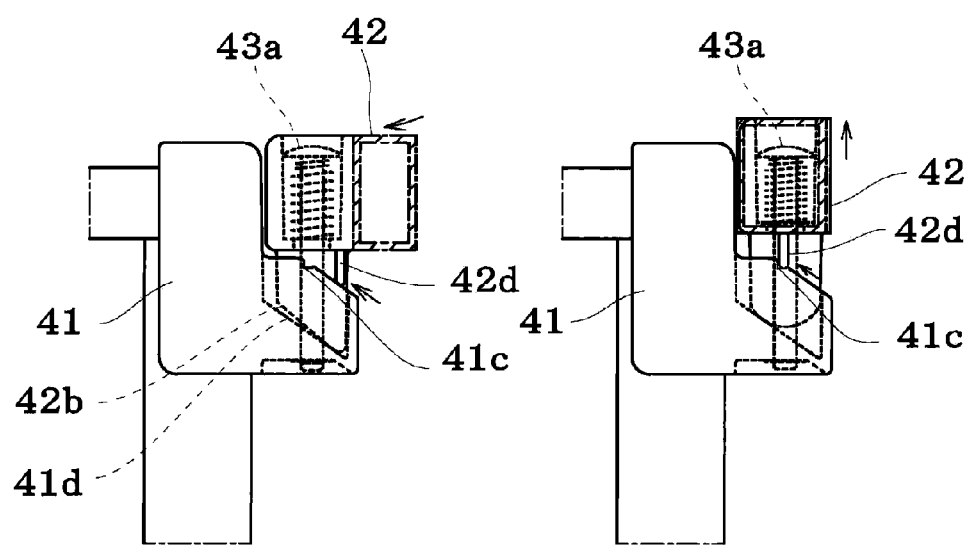

As illustrated in FIGS. 8D and 8E, when the gate 10 is further opened so that the rotation angle reaches 90°, the locking rib 42d of the rotation section 42 is locked by the locking recess 41c of the receiving section 41, and the gate 10 is held in the 90° open state. In this case, the spring 44 is compressed to a maximum extent.

When the gate 10 is closed to some extent so that the rotation angle decreases from 90°, the locking rib 42d is removed from the locking recess 41c, and the rotation force and the weight of the gate 10 are applied to the gate 10. The downward biasing force of the spring 44 is also applied to the gate 10. Therefore, the gate 10 rotates and moves downward along the tilted receiving surface 41d, and closes automatically.

FIGS. 9A to 9D illustrate an example of the structure of the upper locking device 50.

Figure 9A:
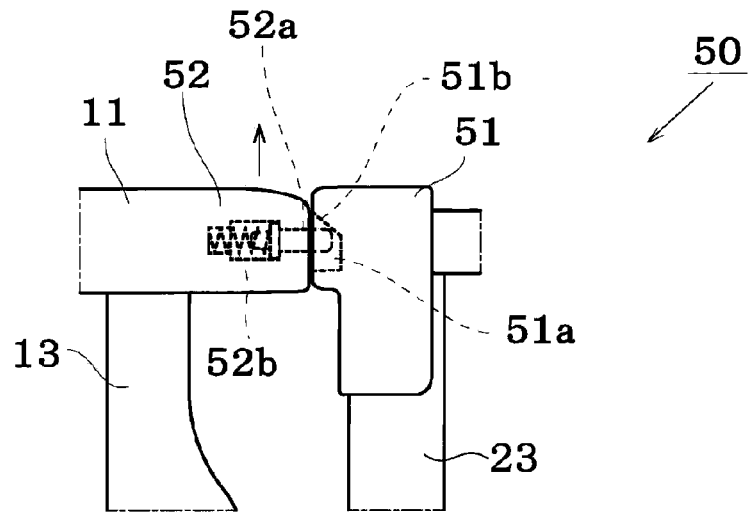
FIG. 9A is an enlarged view of the upper locking device illustrating the locked state.
Figure 9B:
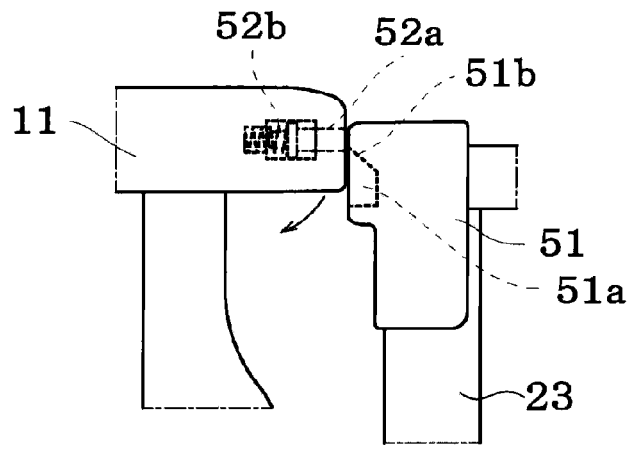
FIG. 9B is an enlarged view of the upper locking device illustrating a state in which the gate moves upward, and the locked state is canceled (i.e., the locking pin is pushed backward)

As illustrated in FIG. 9A, the upper locking device 50 includes a locking receiving section 51 and a locking section 52. The locking section 52 that is provided at the end of the upper crosspiece 11 includes a locking pin 52a that is biased by a spring 52b in the direction in which the locking pin 52a protrudes from the end of the locking section 52, and the locking receiving section 51 is provided on the upper end of the vertical frame 23.

Figure 9C:
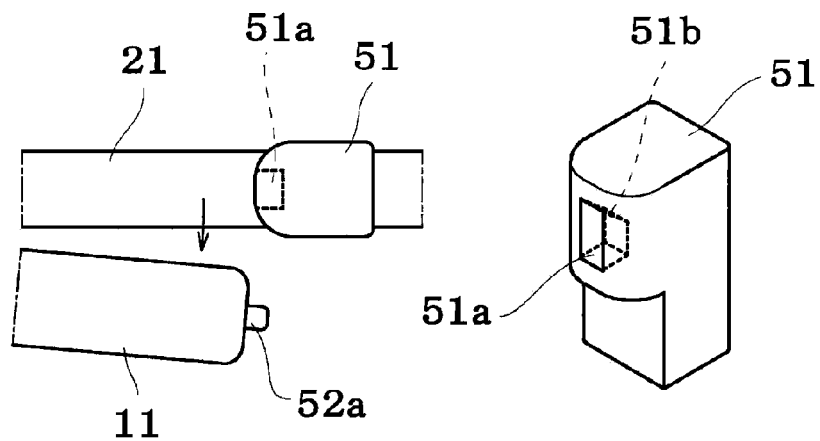
FIG. 9C is an enlarged view of the upper locking device illustrating a state in which the gate is open.
Figure 9D:
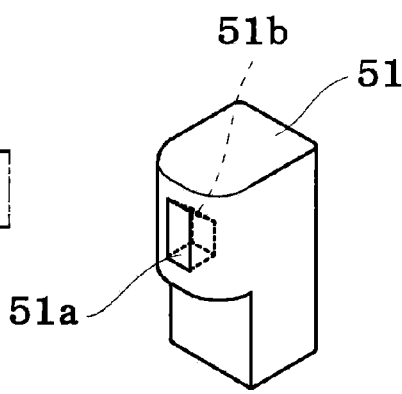
FIG. 9D is a perspective view illustrating the locking recess.

As illustrated in FIGS. 9A and 9D, the locking receiving section 51 includes a locking recess 51a, and a tilted surface 51b that is defined by the upper side of the inner surface of the locking recess 51a.

Therefore, when the gate 10 moves upward (see FIG. 9B), the locking pin 52a moves along the tilted surface 51b, and the gate 10 is released from the locked state, and rotates (see FIG. 9C).

Note that the locking pin may be provided to the frame, and the locking recess may be provided to the gate, differing from the above example.

FIGS. 10A to 10D illustrate an example of the structure of the lower locking device 60.

Figure 10A:
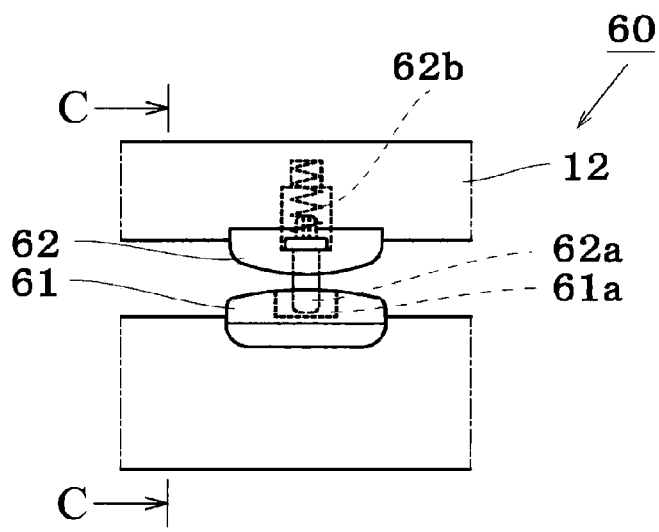
FIG. 10A is an enlarged view of the lower locking device illustrating the locked state.

As illustrated in FIG. 10A, the lower locking device 60 includes a locking receiving section 61 and a locking section 62. The locking section 62 that is provided to the bottom of the lower crosspiece 12 includes a projection pin 62a that is biased downward by a spring 62b.

The locking receiving section 61 that is provided to the base section 21 includes a locking recess 61a, and slope sections 61b that are provided on the front side and the back side of the locking recess 61a. The slope section 61b is tilted downward from the upper opening of the locking recess 61a.

Figure 10B:
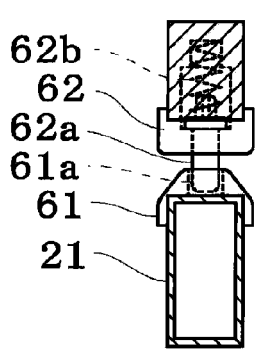
FIG. 10B is an enlarged view of the lower locking device illustrating the locked state.
Figure 10C:
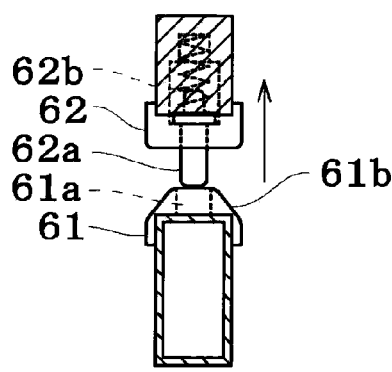
FIG. 10C is an enlarged view of the lower locking device illustrating a state in which the gate moves upward so that the locked state is canceled.
Figure 10D:
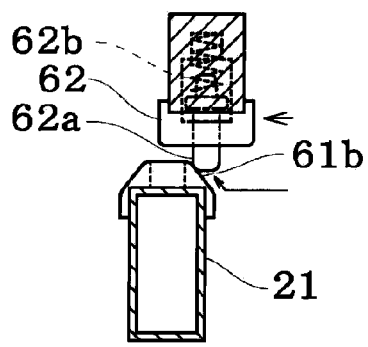
FIG. 10D is an enlarged view of the lower locking device illustrating the motion when the gate is closed.

When the gate 10 moves upward from the position illustrated in FIG. 10B, the locked state of the lower locking device 60 is canceled (see FIG. 10C). When the gate 10 closes, the projection pin 61a is guided upward along the slope section 61b (see FIG. 10D), and enters the locking recess 61a (see FIG. 10B).

An example of the structure of the pedal device 30 is described below with reference to FIGS. 3A to 5C.

The pedal device 30 includes a pair of mounting plates 31 and 32 that are opposite to each other, and a connection section 33 that is approximately in the shape of an inverted letter "U", and connects the center area of the pair of mounting plates 31 and 32. The pedal device 30 is secured on the base section 21 using a fixture 33a (e.g., bolt or nut) so that the base section 21 is inserted into the connection section 33.

The pedals 34 and 35 are rotatably supported by shafts 34b and 35b, respectively, at a position between the mounting plates 31 and 32 on the front side and the back side of the gate 10.

Figure 5A:
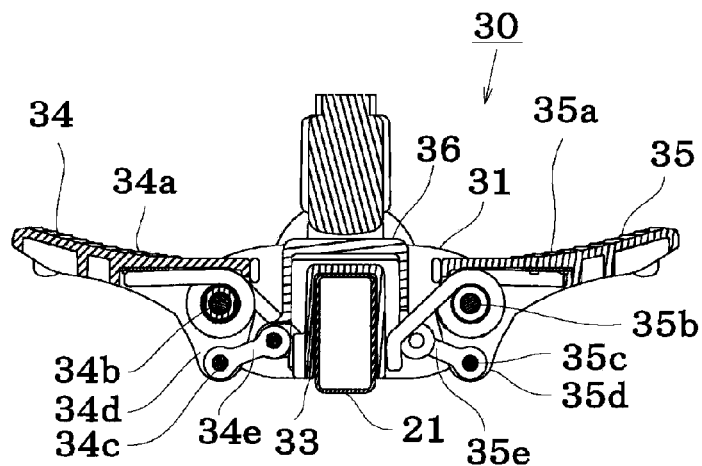
FIG. 5A is a cross-sectional views taken along the line B-B in FIG. 4 illustrating a state in which the gate is closed.
Figure 5B:
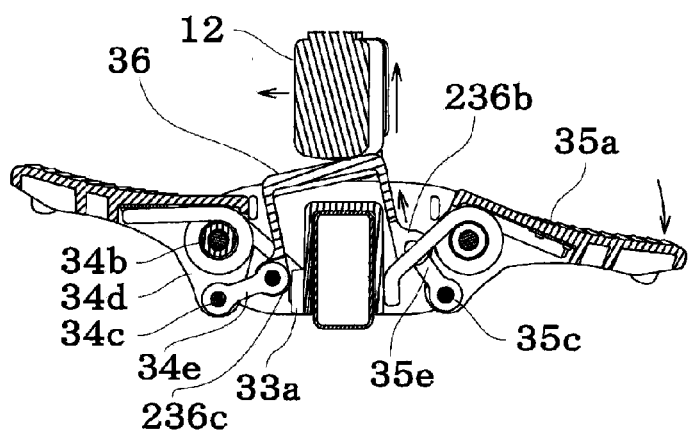
FIG. 5B is a cross-sectional views taken along the line B-B in FIG. 4 illustrating a state in which the push-up member is tilted by operating the pedal to open the gate.
Figure 5C:
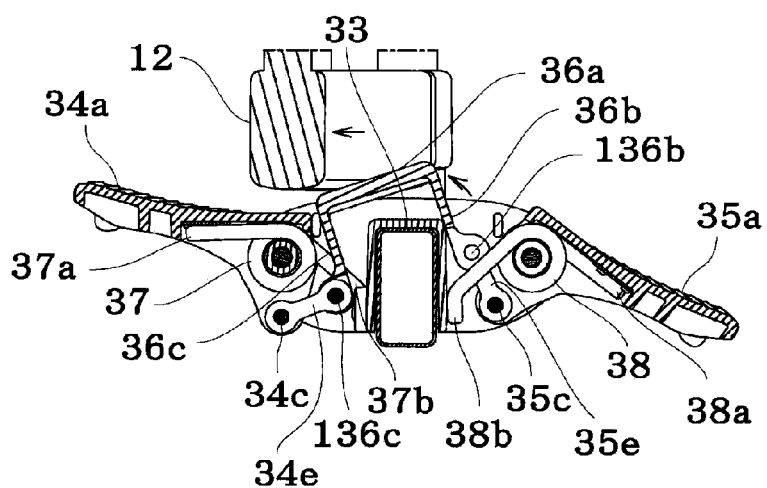
FIG. 5C is a cross-sectional views taken along the line B-B in FIG. 4 illustrating a state in which the push-up member is tilted by operating the pedal to open the gate.

As illustrated in FIGS. 5A to 5C (cross-sectional views taken along the line B-B in FIG. 4), the pedals 34 and 35 are formed approximately in the shape of the letter "L", and respectively include stepping surfaces 34a and 35a that extend away from the base section 21 on the front side and the back side of the gate 10, and action sections 34d and 35d that extend downward from the shafts 34b and 35b.

The pedal device 30 includes a push-up member 36 that is linked to the pedals 34 and 35. The push-up member 36 is disposed between the pedals 34 and 35, for example. The push-up member 36 is linked to the pedals 34 and 35 via link members 34e and 35e.

More specifically, the push-up member 36 includes a push-up surface 36a having a flat upper surface, and side elements 36b and 36c that extend downward from either side of the push-up surface 36a, and is approximately formed in the shape of an inverted letter "U". Channel-like connection sections 236b and 236c are formed on the lower end of the side elements 36b and 36c. One end of the link member 34e and one end of the link member 35e are rotatably supported by the connection sections 236b and 236c using axial attachment sections 136b and 136c, respectively. The other end of the link member 34e and the other end of the link member 35e are rotatably supported by the action sections 34d and 35d of the pedals 34 and 35 using axial attachment sections 34c and 35c, respectively.

The stepping surfaces 34a and 35a of the pedals 34 and 35 are respectively biased by coil springs 37 and 38 so that the stepping surfaces 34a and 35a return to the original approximately horizontal state (see FIGS. 5A to 5C).

The coil springs 37 and 38 are provided so that one end 37a and one end 38a respectively come in contact with the back side of the pedal 34 and the back side of the pedal 35, and the other end 37b and the other end 38b come in contact with the connection section 33.

The biasing force applied by the coil springs 37 and 38 is set so that the stepping surfaces 34a and 35a of the pedals 34 and 35 move downward when a force of 200 to 300 N has been applied to the pedals 34 and 35.

This is advantageous from the viewpoint of safety since the pedal cannot be operated by even a large dog or a child.

The pedal device 30 is configured as described above. As illustrated in FIGS. 5B and 5C, when the pedal 34 or 35 is operated, the push-up surface 36a of the push-up member 36 is moved upward on the side of the operated pedal, and is tilted forward.

Therefore, the push-up force and the forward rotation force are applied to the gate 10 (lower crosspiece 12) (see the arrows in FIGS. 5B and 5C).

FIGS. 2B, 5B, and 5C illustrate a state in which the pedal 35 is operated. When the pedal 34 is operated, the gate 10 opens in the reverse direction.

After the push-up force and the rotation force have been applied to the gate 10 by the pedal device 30 in a state in which the push-up surface 36a comes in contact with the gate 10 (see FIG. 5B), the gate 10 is moved upward and rotated by the rotational support device 40 due to the inertial force of the gate 10 or an external force that further opens the gate 10, and is opened.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A gate apparatus comprising:
   a frame that is approximately in a shape of a letter "U" and includes a base section;
   a gate that opens forward or backward from a closed position at which the gate is disposed inside the frame;
   a rotational support device that supports a first side of the gate so that the gate rotates and moves upward relative to the frame;
   a locking device that locks the gate at the closed position; and
   a pedal device that unlocks the locking device to open the gate,
   the pedal device including a pair of pedals that are provided on the base section and disposed on a front side and a back side of the gate positioned at the closed position, and a push-up member that is linked to the pair of pedals, and
   the push-up member including a push-up surface that tilts so that the push-up surface moves upward and comes in contact with the gate on a side closer to one of the pair of pedals when one of the pair of pedals is operated, and applying forces to the gate that push-up and rotate the gate.

2. The gate apparatus as defined in claim 1,
   the pair of pedals being respectively biased to move when a force equal to or larger than 200 N has been applied.

3. The gate apparatus as defined in claim 1,
   the locking device including an upper locking device that is provided in an upper area on a second side of the gate,
   the upper locking device including an upper locking pin that is biased to protrude from one of the gate and the frame, and an upper locking recess that is provided in the other of the gate and the frame, and
   an upper side of an inner surface of the upper locking recess defining a tilted surface.

4. The gate apparatus as defined in claim 3,
   the locking device including a lower locking device that is provided to a bottom of the gate, the lower locking device including a lower locking pin that is biased to protrude from one of the gate and the frame, and a lower locking recess that is provided in the other of the gate and the frame.

5. The gate apparatus as defined in claim 1,
   the rotational support device including a tilted receiving surface that is provided on a side of the frame, and a tilted sliding contact surface that is provided on a side of the gate, the tilted sliding contact surface being placed on the tilted receiving surface from above, and
   the tilted receiving surface and the tilted sliding contact surface coming in surface contact with each other at a downward angle toward the gate when the gate is set to the closed position.

6. The gate apparatus as defined in claim 5,
   the rotational support device further including a spring that applies a force that causes the tilted sliding contact surface to come in contact with the tilted receiving surface, the spring being compressed when the gate moves upward.

7. The gate apparatus as defined in claim 1,
   the push-up member being disposed between the pair of pedals, and being linked to the pair of pedals.

* * * * *